Figure 3:
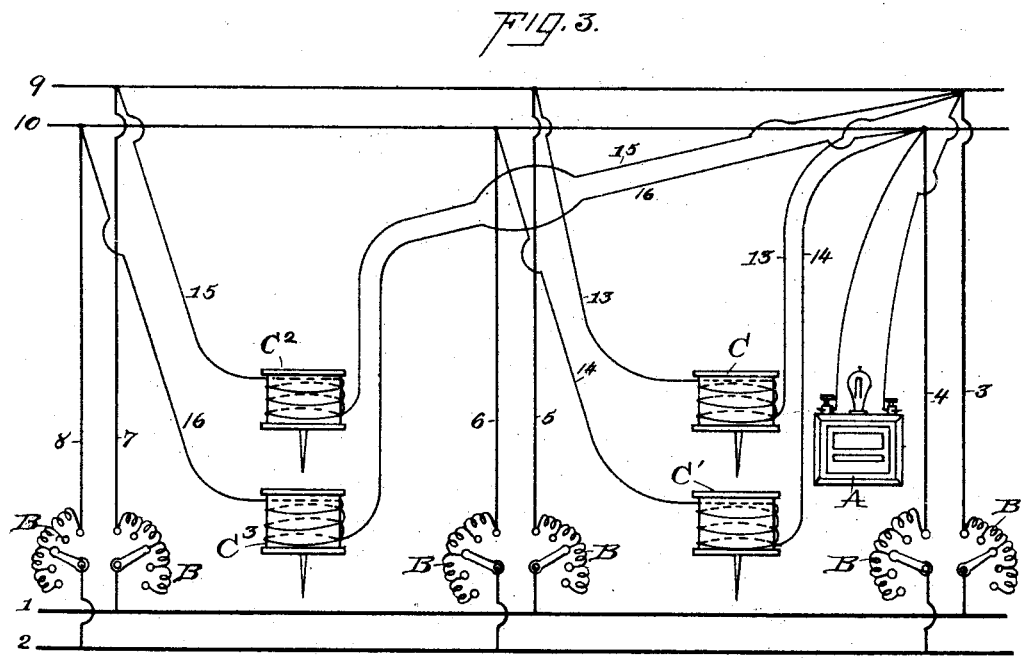

(No Model.)  2 Sheets—Sheet 1.
J. W. HOWELL.
ELECTRICAL DISTRIBUTION.
No. 372,798.  Patented Nov. 8, 1887.
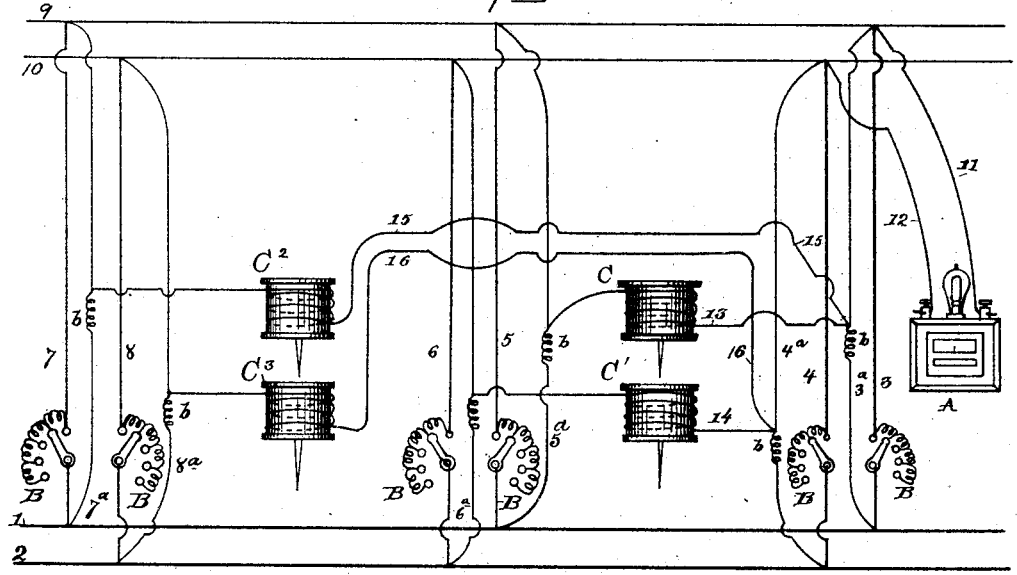
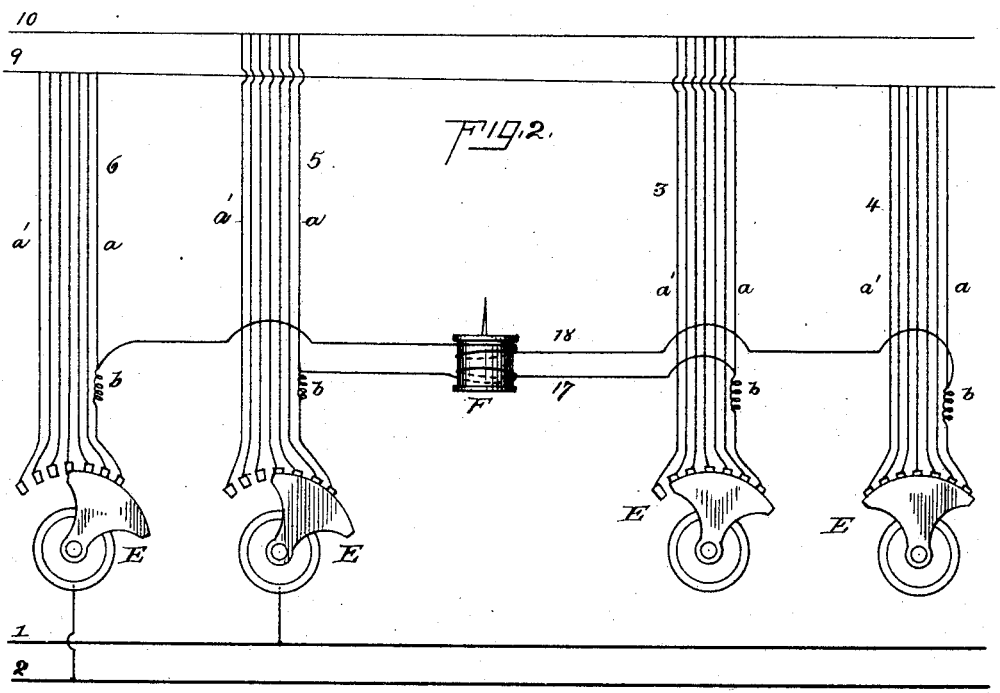
ATTEST:  INVENTOR:

(No Model.)

2 Sheets—Sheet 2.

J. W. HOWELL.
ELECTRICAL DISTRIBUTION.

No. 372,798.   Patented Nov. 8, 1887.

UNITED STATES PATENT OFFICE.

JOHN W. HOWELL, OF NEW BRUNSWICK, NEW JERSEY.

ELECTRICAL DISTRIBUTION.

SPECIFICATION forming part of Letters Patent No. 372,798, dated November 8, 1887.

Application filed March 4, 1887. Serial No. 229,686. (No model.)

*To all whom it may concern:*

Be it known that I, JOHN W. HOWELL, of New Brunswick, in the county of Middlesex and State of New Jersey, have invented a certain new and useful Improvement in Systems of Electrical Distribution, of which the following is a specification.

My invention relates to systems of electrical distribution in which two or more feeding-circuits extend from a common source of supply to a connected system of mains or lighting-conductors, with which the electric lamps or other translating devices to be supplied are joined. In such a system it is necessary to maintain the same pressure or difference of potential at the terminals of all the feeding-circuits, so that the same constant pressure is obtained for all the translating devices.

The object of my invention is to provide in such a system a simple, convenient, and reliable system or arrangement of indicating devices for showing the potential at the ends of the feeders, in accordance with which showing the feeders may be separately regulated.

In carrying my invention into effect I employ indicating devices which compare the losses of potential on the feeders with those on a standard feeder.

My invention includes several different specific ways of doing this, which are illustrated in the annexed drawings.

Figure 1 is a diagram of a system showing my invention in connection with a system having each of its feeding-conductors made in two strands; Fig. 2, a diagram showing my invention where the feeding-conductors are each made in several strands placed in and out of circuit by switches, and Fig. 3 a diagram showing my invention with simple galvanometers connected to the outer ends of the feeders.

Referring first to Fig. 1, 1 and 2 represent the positive and negative omnibus wires at the central station, from which three feeding-circuits, 3 4, 5 6, and 7 8, extend to the circuit 9 10, which represents the system of mains or positive and negative lighting - conductors. The feeder 3 4 is the standard feeder. From its outer terminals an indicating circuit, 11 12, extends back to the central station, where it is connected to an indicator, A, of electromotive force, which indicates absolutely the pressure at the feeder terminals. The indicator A is preferably of the kind set forth in my Patent No. 339,085, dated March 30, 1886. In accordance with the indications of this instrument the adjustable resistances B B in the feeder 3 4 are regulated so that the pressure desired in the mains is constantly maintained at its terminals. Each conductor of each feeding-circuit is provided with an extra wire, $3^a$ $4^a$ $5^a$, &c., each of which wires extends from one terminal of the conductor to the other. These wires are much smaller than the main feeder-wires 3 4 5, &c., so that they carry only a very small portion of the current of the feeders. Each of the main feeder-wires is preferably provided with an adjustable resistance, B, for regulating the pressure at the feeder terminals. Each of the extra feeder-wires has in it, near its junction with the omnibus wires, a resistance-coil, $b$, or other fixed resistance. The resistances $b$ in all the feeders bear the same ratio to the resistances of the respective conductors in which they are located.

By conductor 13 the outer end of the fixed resistance in $3^a$ is joined to the outer end of the fixed resistance in $5^a$, and by conductor 14 the outer end of fixed resistance $4^a$ is joined to the outer end of that in $6^a$. By conductors 15 and 16 the outer ends of the fixed resistances in $3^a$ and $4^a$ are joined, respectively, to those in $7^a$ and $8^a$. Each of these conductors 13, 14, 15, and 16 includes the coils of a simple galvanometer, C, C', C², or C³. The effect of this arrangement is as follows: Considering, for example, the feeding-conductors 3 $3^a$ and 5 $5^a$ joined through the galvanometer C, if the potential at the outer terminals of these two conductors is the same, as it should be, then the potentials at the outer ends of their fixed resistances will be the same. Since the fixed resistances are similarly proportioned to the resistances of the feeders outside of such resistances, and since the resistance of the conductors between the resistances and the omnibus-wires being inconsiderable need not be taken into account, then under these circumstances no current will flow in wire 13 and the galvanometer C will stand at zero. If, however, the potential at the outer terminal of conductor 5 $5^a$ becomes greater or less than the standard potential maintained at the terminal of 3 $3^a$, then the potential at the outer end of the fixed resistance in 5ª will be greater or less than that at the corresponding point in 3ª, and current will flow in wire 13 either from or to the standard feeder, whereby the galvanometer C will be deflected in one direction or the other, and by the direction and amount of such deflection the wrong potential at the terminal of conductor 5 5ª is shown, and the potential is brought back to the standard by adjusting the resistance B in the main wire 5 of the conductor until the galvanometer C stands at zero again. Galvanometer C' in the same way shows whether or not the potential on negative conductor 6 6ª is the same as that on the standard negative conductor, and this also is regulated in accordance with this showing by the adjustment of its resistance B. In the same way galvanometers C² and C³ compare the potentials of feeder 7 8 with those of the standard feeder, and these also are regulated by their adjustable resistances, whereby the constant standard pressure is maintained in all parts of the system of mains.

The galvanometers connecting like conductors compare absolutely the potentials on said conductors, and both sides of each circuit being regulable, not only are the differences of potential kept the same at the feeder terminals, but so, also, are absolute potentials at the terminals of like conductors. If there were differences of potentials between like conductors of two feeders, useless currents would flow in the mains between their terminals, whereby loss of energy, heating of the main conductors, and unequal pressures might ensue.

In the system shown in Fig. 2 each feeding-conductor is composed of a number of strands, $a\ a'$, and a switch, E, is provided in each conductor, whereby the number of strands in circuit is varied. In the strand or part $a$ of the feeder which remains longest in circuit, or which is always in circuit when the feeder is in use, is placed in each feeding-conductor the resistance $b$. This strand containing the resistance corresponds with the extra wire in Fig. 1, since it remains unchanged in circuit, while the resistance of the rest of the conductor is varied. The feeder 3 4 may be considered as the standard feeder, though the absolute indicator and its circuit are omitted on account of lack of space. The outer end of the fixed resistance in the positive conductor 3 of this circuit is connected by wire 17 with the outer end of the fixed resistance in the like conductor, 5, of the other feeder, and the resistances of the other two like conductors are connected through wire 18. Wires 17 18 each include part of the coils of a differential galvanometer, F. When the losses in all the feeding-conductors are equal, then the potentials at the outside ends of the resistances in the two positive conductors will be the same, and the potentials at the outside ends of the resistances in the negative conductors will be the same; hence no current will flow in either coil of galvanometer F and it will remain at zero. If the loss in 3 is greater or less than the loss in 4 and the loss in 5 greater or less than the loss in 6, currents may flow in both coils of F; but as long as the sum of the losses in 3 and 4 is equal to the sum of the losses in 5 and 6 the currents in F will neutralize each other and F will remain on zero, as it should, as when the sums of the losses, as above, are equal the pressures at the feeder ends will be equal.

The arrangement of simple galvanometers shown in Fig. 1 may also be used with the stranded feeders of Fig. 2. So may the differential galvanometer shown in Fig. 2 be used with a feeder in two parts, as shown in Fig. 1. I desire, however, to cover the connecting of the indicating devices at the outer ends of the fixed resistances both with simple and with differential galvanometers.

The arrangement of simple galvanometers may, however, be used also without the fixed resistances and with feeders, each of whose indicators is in one part only, as is illustrated in Fig. 3. In the arrangement shown in this figure conductors 13, 14, 15, and 16 are taken from the outer terminals of the feeding-conductors connecting each conductor of the standard circuit 5 6 with like conductors of the other feeding-circuits. These connecting-conductors all extend to the central station, and there include the coils of simple galvanometers C C' C², and C³, as in Fig. 1. These galvanometers indicate in the same way as those of Fig. 1, except that the currents passing through them depend upon the potentials at the ends of the feeders, instead of the outside ends of the fixed resistances.

What I claim is—

1. In a system of electrical distribution, the combination of two or more feeding-circuits, each provided with means for regulating its current, an absolute indicator connected with the outer terminals of one of said feeders, whereby the standard pressure may be maintained on said feeder and conductors, each joining one of the conductors of the standard feeder, through the coils of a simple galvanometer, with the like conductor of each of the other feeders, substantially as set forth.

2. In a system of electrical distribution, the combination of two or more feeding-circuits, one of which is a standard circuit, and each of which is composed of two or more parts or strands, and conductors joining a strand of each of the conductors of the standard feeder with strands of like conductors of each of the other feeders through current-indicating apparatus, substantially as set forth.

3. In a system of electrical distribution, the combination of two or more feeding-circuits, each composed of two or more parts or strands, one of which circuits is a standard circuit, and conductors each joining a strand or part of one of the conductors of the standard feeder, through a simple galvanometer, with a strand of the like conductor of each of the other feeders, substantially as set forth.

4. In a system of electrical distribution, the combination of two or more feeding-circuits, one of which is a standard circuit, a fixed resistance in each conductor of each of said circuits, conductors joining the outer ends of the fixed resistances in the standard circuit with the outer ends of the fixed resistances of like conductors in the other circuits, and indicating apparatus in said conductors, substantially as set forth.

5. In a system of electrical distribution, the combination of two or more feeding-circuits, one of which is a standard circuit, a fixed resistance in each conductor of each of said circuits, and conductors joining the outer ends of the fixed resistances in the standard circuit to the outer ends of fixed resistances in like conductors of each of the other circuits, each of said joining-conductors including the coils of a simple galvanometer, substantially as set forth.

6. In a system of electrical distribution, the combination of two or more feeding-circuits, one of which is a standard circuit, and the conductors of which circuits are composed of two parts, means for regulating the resistance of one of said parts of each conductor, while the resistance of the other parts remains constant, a fixed resistance-coil in each of said constant parts, and conductors joining the outer ends of each of the fixed resistances in the conductors of the standard feeder with the outer ends of the resistances in like conductors of each of the other feeders, and indicating apparatus in said joining-conductors, substantially as set forth.

7. In a system of electrical distribution, the combination of feeding-circuits, each conductor of which is composed of two parts or strands, one of which is much smaller than the other, the smaller part including a fixed resistance and the larger part an adjustable resistance, and indicating apparatus affected by the losses in the said fixed resistances, substantially as set forth.

This specification signed and witnessed this 28th day of February, 1887.

JOHN W. HOWELL.

Witnesses:
   FRANCIS E. JACKSON,
   GEORGE F. MORRISON.